United States Patent
Shao

(10) Patent No.: US 12,367,363 B2
(45) Date of Patent: Jul. 22, 2025

(54) METHOD AND DEVICE FOR POSITIONING, AND STORAGE MEDIUM

(71) Applicant: GUANGDONG OPPO MOBILE TELECOMMUNICATIONS CORP., LTD., Guangdong (CN)

(72) Inventor: Shuai Shao, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 405 days.

(21) Appl. No.: 18/090,135

(22) Filed: Dec. 28, 2022

(65) Prior Publication Data

US 2023/0214620 A1 Jul. 6, 2023

Related U.S. Application Data

(63) Continuation of application No. PCT/CN2020/125504, filed on Oct. 30, 2020.

(51) Int. Cl.
*H04W 4/029* (2018.01)
*G06K 17/00* (2006.01)
*H04B 17/318* (2015.01)

(52) U.S. Cl.
CPC ....... *G06K 17/0022* (2013.01); *H04B 17/318* (2015.01); *H04W 4/029* (2018.02)

(58) Field of Classification Search
CPC ....... H04W 4/029; H04W 4/021; H04W 4/80; H04W 4/38; H04W 4/33; H04W 4/35; H04W 4/023; H04W 84/18; H04W 64/003; H04W 8/005; H04W 88/06; H04W 88/16; H04W 16/14; H04W 24/10; H04W 4/025;
(Continued)

(56) References Cited

U.S. PATENT DOCUMENTS 8,164,422 B2 * 4/2012 Nagai .................. G06K 7/0008
340/8.1
10,541,764 B1 * 1/2020 Parshin ................ H04B 17/391
(Continued)

FOREIGN PATENT DOCUMENTS

CN  101131432 A  2/2008
CN  101191833 A  6/2008
(Continued)

OTHER PUBLICATIONS

International Search Report in the international application No. PCT/CN2020/125504, mailed on Jul. 29, 2021.
(Continued)

*Primary Examiner* — Joseph Arevalo
(74) *Attorney, Agent, or Firm* — Ladas Parry LLP

(57) ABSTRACT

Provided are a method and device for positioning, and a non-transitory computer-readable storage medium. The method includes: receiving a positioning indication, herein the positioning indication indicates positioning of a first item, and the first item has a first electronic tag; obtaining RSSIs of a plurality of second electronic tags, herein the plurality of second electronic tags include the first electronic tag; determining, based on the RSSIs of the plurality of second electronic tags, at least one third electronic tag; and positioning, through the at least one third electronic tag, the first item.

20 Claims, 17 Drawing Sheets

(58) Field of Classification Search
CPC ..... H04W 4/185; H04W 52/38; H04W 84/12; H04W 4/02; H04W 4/024
USPC .................. 455/456.1, 457, 456.3, 456.2
See application file for complete search history.

(56) References Cited

U.S. PATENT DOCUMENTS

| | | | | |
|---|---|---|---|---|
| 11,775,928 | B1* | 10/2023 | Hanna | G08G 1/205 455/456.1 |
| 2006/0012480 | A1* | 1/2006 | Klowak | G06Q 20/203 340/8.1 |
| 2008/0100450 | A1* | 5/2008 | Ayyagari | B64D 25/18 340/572.7 |
| 2009/0102661 | A1* | 4/2009 | Barnes | G01S 5/0289 340/572.1 |
| 2010/0073188 | A1* | 3/2010 | Mickle | G06Q 10/00 340/8.1 |
| 2011/0057840 | A1 | 3/2011 | Ko | |
| 2013/0088334 | A1 | 4/2013 | Chen et al. | |
| 2014/0327521 | A1* | 11/2014 | Chen | G06Q 10/087 340/8.1 |
| 2014/0368334 | A1* | 12/2014 | Tian | H04W 64/00 340/539.13 |
| 2016/0003932 | A1 | 1/2016 | Whitney et al. | |
| 2018/0306895 | A1 | 10/2018 | Nossik | |
| 2019/0080280 | A1* | 3/2019 | Tingler | G06K 7/10475 |
| 2019/0080281 | A1* | 3/2019 | Tingler | G06Q 10/087 |
| 2019/0220634 | A1* | 7/2019 | Cossairt | A63G 31/00 |
| 2019/0325173 | A1* | 10/2019 | Tingler | G06K 7/10356 |
| 2020/0117863 | A1* | 4/2020 | Ha | G06K 19/07771 |
| 2021/0356551 | A1* | 11/2021 | Kamiya | B65G 1/1371 |
| 2022/0117197 | A1* | 4/2022 | Wilkinson | G01S 5/0295 |
| 2023/0300565 | A1* | 9/2023 | Hanna | H04W 4/029 455/456.3 |

FOREIGN PATENT DOCUMENTS

| | | |
|---|---|---|
| CN | 102104660 A | 6/2011 |
| CN | 102111876 A | 6/2011 |
| CN | 103969623 A | 8/2014 |
| CN | 105510908 A | 4/2016 |
| CN | 106486296 A | 3/2017 |
| CN | 109033908 A | 12/2018 |

OTHER PUBLICATIONS

English translation of the Written Opinion of the International Search Authority in the international application No. PCT/CN2020/125604, mailed on Jul. 29, 2021.
Supplementary European Search Report in the European application No. 20959260.9, mailed on Jul. 5, 2023. 7 pages.

* cited by examiner

| Query | cmd | find |
|---|---|---|
| | Item_name | Key |

FIG. 5A

| Response | {"response":[{"epc":"xxxx","mob-item":"yyy"},{"dist":aaaa,"epc":"bbbb","ref-item":"cccc"}, | Distance information of a tag to be found, a reference tag, and other nearby tags |
|---|---|---|
| | {"error":"no such cmd"} | When input cmd is incorrect |

FIG. 5B

METHOD AND DEVICE FOR POSITIONING, AND STORAGE MEDIUM

CROSS REFERENCE TO RELATED APPLICATION

This is a continuation of International Patent Application No. PCT/CN2020/125504 filed on Oct. 30, 2020, the disclosure of which is hereby incorporated by reference in its entirety.

BACKGROUND

At present, the current positioning technology is intended to calculate the accurate coordinates of a positioned item, for example, the coordinate (x, y, z) information of the positioned item, and then achieve the positioning of the physical position of an object by combining the known coordinates and the comparison (such as a map) of the physical position. When an item is positioned in an indoor living environment, the coordinate (x, y, z) information cannot be directly understood by a user, such that it is difficult for the user to position the position of the item in an indoor scene by using the current positioning technology.

SUMMARY

The disclosure relates to the technical field of communications, in particular, to a method and device for positioning, and a non-transitory computer-readable storage medium. A first aspect provides a method for positioning, which includes the following operations.

A positioning indication is received. The positioning indication indicates positioning of a first item, and the first item has a first electronic tag.

Received Signal Strength Indicators (RSSIs) of a plurality of second electronic tags are obtained. The plurality of second electronic tags include the first electronic tag.

At least one third electronic tag is determined based on the RSSIs of the plurality of second electronic tags.

The first item is positioned through the at least one third electronic tag.

A second aspect provides a device for positioning, which includes a receiver and a processor.

The receiver is configured to: receive a positioning indication, where the positioning indication indicates positioning of a first item, and the first item has a first electronic tag; and obtain RSSIs of a plurality of second electronic tags, where the plurality of second electronic tags include the first electronic tag.

The processor is configured to: determine, based on the RSSIs of the plurality of second electronic tags, at least one third electronic tag; and position, through the at least one third electronic tag, the first item.

A third aspect provides a non-transitory computer-readable storage medium having stored thereon computer-executable instructions that, when executed by a processor, cause the processor to perform operations as follows.

A first aspect provides a method for positioning, which includes the following operations.

A positioning indication is received. The positioning indication indicates positioning of a first item, and the first item has a first electronic tag.

RSSIs of a plurality of second electronic tags are obtained. The plurality of second electronic tags include the first electronic tag.

At least one third electronic tag is determined based on the RSSIs of the plurality of second electronic tags.

The first item is positioned through the at least one third electronic tag.

BRIEF DESCRIPTION OF THE DRAWINGS

FIG. 5A is a schematic diagram of representation of positioning execution information according to an embodiment of the disclosure.

FIG. 5B is a schematic diagram of representation of a positioning result according to an embodiment of the disclosure.

DETAILED DESCRIPTION

Figure 1:
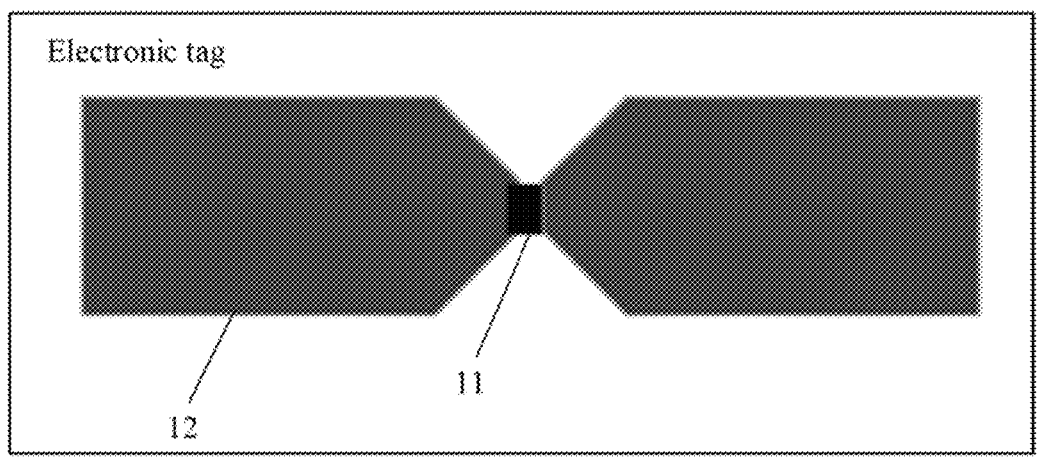
FIG. 1 is a schematic structural diagram of an electronic tag according to an embodiment of the disclosure.

The technical solutions in the embodiments of the disclosure will be described below in combination with the drawings in the embodiments of the disclosure. It is apparent that the described embodiments are only part of the embodiments of the disclosure, not all the embodiments. Based on the embodiments in the disclosure, all other embodiments obtained by those of skilled in the art without creative work shall fall within the protection scope of the disclosure.

In the embodiments in the disclosure, the words "exemplary" or "for example" are used to indicate an example, illustration or description. Any embodiment or design solution described as "exemplary" or "for example" in the embodiments of the disclosure should not be construed as superior or more advantageous than other embodiments or design solutions. Rather, the use of the words such as "exemplary" or "for example" is intended to present the relevant concepts in a specific manner.

The term "and/or" in the disclosure is merely an association relationship describing related objects, which means that there may be three relationships, for example, A and/or B may indicate three cases: A exists alone, A and B exist simultaneously, and B exists alone. Herein, the symbol "/" indicates that an associated object is an OR relationship, for example, A/B means A or B.

A Radio Frequency (RF) positioning technology is widely used during daily life. The Global Navigation Satellite System (GNSS) is a technology dedicated to positioning by communicating with satellites. A GNSS system, such as a Global Positioning System (GPS), may output the precise coordinates (x, y, z) of a positioned instrument, and may display an accurate geographical position of the positioned device by combining a map.

In addition, some wireless technologies specialized in communication can also implement simple positioning functions, such as Bluetooth, WIFI, and cellular networks. The principle of the technologies is to determine a relative position of the positioned device and a base station, and then calculate the physical coordinates (x, y, z) of a positioned object when the position of the base station is known.

Regardless of the wireless communication technology used, several main applications of the principle of positioning include the following.

1. An RSSI may roughly determine the distance between an emission source and a receiving device. Signal strength is inversely proportional to the distance, which may be called a backscatter technology.

2. An Angle of Arrival (AOA), which is an incident angle, may position a relative angle of the emission source and the receiving device.

3. Time of Flight (TOF) may calculate the distance between the emission source and the receiving device by calculating electromagnetic wave transmission time.

As described above, in the related art, the above three (RSSI, AOA and TOF) wireless communication technologies are intended to calculate the accurate coordinates (x, y, z) of the positioned device, and then achieve the positioning of the physical position of the object by combining the known coordinates with the comparison (such as a map) of the physical position. For large-range accurate navigation, such methods have obvious advantages. However, for limited environments (such as offices and living environments), such methods cannot provide desirable user experience.

In an aspect, coordinate information has no practical significance to users. During the finding of an item in the living environment, the coordinates (x, y, z) of the determined item cannot be directly used by the users. For example, a positioned item is a "remote control"; and if information fed back by a positioning algorithm is that the position of the "remote control" is "x=5 meters, y=3 meters, z=4 meters", such information has no practical significance to the users, and the users cannot find the "remote control" by means of such information.

In another aspect, an establishment of a map is complicated. The GNSS system uses a map including a coordinate system. However, the establishment of the map in an indoor environment is very cumbersome and complicated, which requires to perform accurate measurement on the indoor environment. Since the operation is complicated, a normal user cannot complete the operation by himself. In addition, due to the wide variety of indoor environments and diverse requirements, professional mapping companies cannot obtain enough economic benefits from work, such that, the establishment of maps for the indoor environment is difficult to achieve in practical applications.

In addition, although the WIFI, the Bluetooth and Ultra Wide Bandwidth (UWB) may achieve limited indoor positioning currently, since technologies such as AOA or TOF are required to be used, these technologies require professional devices, such that high cost causes economic burden to consumers.

Finding items in the indoor environments is a common problem, and the current technical means of relevant positioning technologies cannot effectively assist the users in finding the items indoors. For example, if the place of the "remote control" or the "cell phone" is often forgotten in daily life, how to find them often has no clue.

In conclusion, at present, it is not possible to provide a low-cost indoor positioning technology that meets the requirements of the users for indoor positioning.

By combining 5G and the Internet of Things (IOT) technology trend, ongoing research is performed on the practical application of the backscatter technology. The embodiments of the disclosure provide a method for positioning, a device and system, which may use the backscatter technology to position an indoor item. Since the positioning cost of the backscatter technology is much lower than the current positioning technologies such as the WIFI, the Bluetooth and the UWB, when being applied to the finding of the items in the indoor environment, the solution meets the requirements of the users for finding the items to the greatest extent. The backscatter technology may implement positioning functions by means of an algorithm and hardware design.

When the technical method provided in the embodiments of the disclosure is applied to the indoor environment, a backscatter tag (which is referred to as an electronic tag in the embodiments of the disclosure) is disposed for the indoor item (including an item required to be positioned and a reference item). For example, wallets, keys, remote controls and cell phones can be common items required to be positioned; and items that are not often moved, such as tables, sofas, beds, vases, lamps, can be the reference items. The electronic tag of the item required to be positioned is the same as that of the reference item.

It is understandable that, the concepts of "item required to be positioned" and "reference item" are introduced here to make them easier for readers to understand. In fact, all items can be understood as items required to be positioned, and all items can be understood as the reference items.

The method for positioning provided in the embodiments of the disclosure is applied to a system for positioning at least including a device for positioning and an electronic tag. There may be one or more positioning devices in the system for positioning, and there may also be one or more electronic tags. The device for positioning may be a card reader mentioned below.

Optionally, in some embodiments, the electronic tag may be attached to a surface of a positioned item by means of an adhesive.

Optionally, in some embodiments, the electronic tag may be embedded into the item.

Optionally, in some embodiments, the electronic tag may be integrated to an item electronic system. For example, a circuit board of the item includes an antenna, a tag chip may be integrated into the circuit board of the item, and share the original antenna of the circuit board of the item.

In the embodiments of the disclosure, the electronic tag may include a backscatter module. That is to say, the electronic tag is an electronic tag (for example, a passive RFID tag) using backscatter to achieve communication. Exemplarily, FIG. 1 is a schematic structural diagram of an electronic tag. The electronic tag is composed of two portions, which are a chip 11 and an antenna 12 in FIG. 1. The electronic tag does not carry a battery or a power supply. The chip of the electronic tag may be operated by depending on RF energy that is collected by means of the antenna.

The chip of the electronic tag has an Electronic Product Code (EPC). The EPC is composed of n-bit characters. One EPC may independently identify one electronic tag.

It is to be noted that, in the embodiments of the disclosure, in addition to using the EPC to identify the electronic tag, other identifiers that may have a unique identification role may also be used to identify the electronic tag. The embodiments of the disclosure are not specifically limited thereto.

Figure 2:
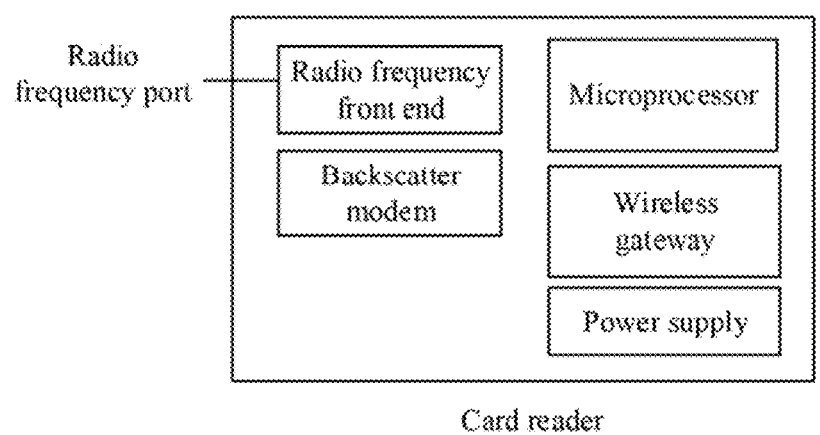
FIG. 2 is a schematic structural diagram of a card reader according to an embodiment of the disclosure.

In the embodiments of the disclosure, the device for positioning may be a card reader. FIG. 2 is a schematic structural diagram of a card reader. The card reader includes an RF front end, a backscatter modem, a microprocessor, wireless network management (for example, WIFI) and a power supply (which may also include a power supply management chip). The card reader may include one or more RF ports. These RF ports may be connected to antennas.

The RF front end is used to receive and transmit a signal. The backscatter modem is used to perform modulation and demodulation on the received signal, obtain an RSSI of the electronic tag and provide the RSSI to the microprocessor. The microprocessor is used to combine, based on the obtained RSSI of the electronic tag, a positioning algorithm of the solution, to determine positioning information. A wireless gateway is used to provide WIFI access or other network access.

In the embodiments of the disclosure, the card reader may receive a received signal of the electronic tag through the antenna, and then determine the reference item near the positioned item by using the positioning algorithm according to the RSSI through the microprocessor, to achieve a positioning function. After obtaining an instruction for positioning a first item, the card reader may obtain the RSSIs of a plurality of electronic tags within a coverage area of the card reader. In a case that the obtained RSSIs include the RSSI of a first electronic tag of the first item, the RSSIs of other electronic tags may be compared with the RSSI of the first electronic tag. One or more electronic tags (that is, third electronic tags), the distance of which from the first electronic tag is within a preset distance range are determined among these other electronic tags. Then, the first item is positioned by means of the one or more electronic tags. Items corresponding to the one or more electronic tags may be determined, and the first item is positioned through these items.

In the embodiments of the disclosure, the card reader may include a receiving antenna, or include a plurality of receiving antennas.

In the embodiments of the disclosure, the antenna of the card reader may use various modes, for example, a dipole antenna, a patch antenna, a yagi-Uda antenna, a monopole antenna, a microstrip antenna and a pifa antenna.

Optionally, in the embodiments of the disclosure, the antenna of the card reader may be flexibly selected from antennas of different modes. For example, there is a card reader in the system for positioning. The card reader has four RF interfaces. The four RF interfaces may be connected to four identical patch antennas. Alternatively, two RF interfaces may be connected to the patch antennas, and the other two RF interfaces may be connected to the monopole antennas.

It is understandable that, in a case that there are a plurality of card readers in the system for positioning, the antennas of different modes may also be used among the card readers. That is to say, in the same system for positioning, the types of the antennas provided for different card readers may be the same or different.

Optionally, the system for positioning provided in the embodiments of the disclosure may further include a narrow system and a generalized system. Exemplarily, as shown in FIG. 3, the narrow system may include a plurality of electronic tags (2 electronic tags are shown in FIG. 1, but there may be more in practice), a card reader and a cloud server.

Figure 3:
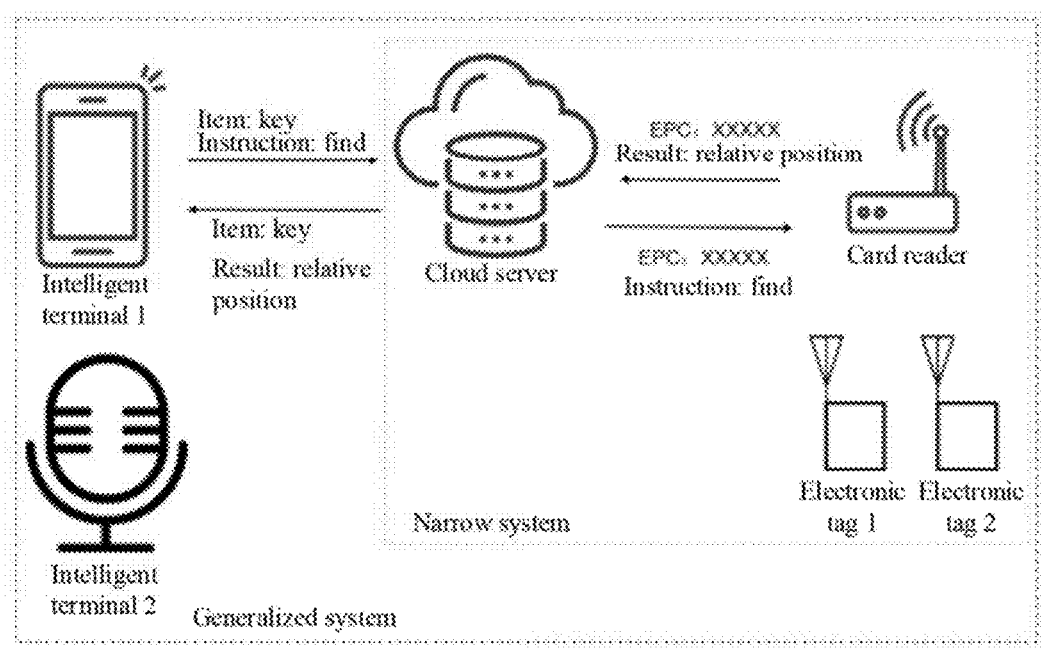
FIG. 3 is a schematic architecture diagram of a system for positioning according to an embodiment of the disclosure.

Further, as shown in FIG. 3, in addition to including the narrow system, the generalized system may further include other intelligent terminals or intelligent terminal API interfaces, to achieve a communication between devices in the narrow system and these other intelligent terminals.

It is to be noted that, in the system for positioning shown in FIG. 3, there may be a plurality of electronic tags, there may be one or more card readers, and there may also be one or more intelligent terminals. The number of the electronic tags in the system and the number of the card readers are not specifically limited.

The intelligent terminals may be smart phones, tablet computers, learning machines, intelligent household electrical appliances (such as smart speakers), wearable devices, robots or other electronic devices. The intelligent terminals may have speech functions and Internet access functions.

When the system for positioning shown in FIG. 3 is used to implement the method for positioning provided in the embodiments of the disclosure, a user may send an instruction (which may be a speech instruction) for finding a key to the intelligent terminal in FIG. 3 through speech input. For example, the user may say "where is my key", then the intelligent terminal sends the speech instruction to the cloud server, and the cloud server may perform speech semantic analysis on the speech instruction. After key information of "find" and "key" are extracted, instruction information for positioning the key is generated based on the key information. The cloud server may send the instruction information to the card reader. The card reader may store a correspondence table (shown in Table 1 below) of item names and electronic tag EPCs. The card reader may obtain the RSSIs of all electronic tags within the coverage area of the card reader. The collected RSSIs of the electronic tags are gathered in the microprocessor of the card reader. The microprocessor may determine, based on the collected RSSIs of the electronic tags, one or more second electronic tags, the distance of which from a first electronic tag of the key is less than a preset distance, and may feed back the EPCs of the one or more second electronic tags to the cloud server. The cloud server determines item names near the key through correspondences between the item names and the EPCs, and then feeds back the determined item names near the key to the intelligent terminal 1. The intelligent terminal 1 may generate positioning information based on these item names, and output the positioning information to the user.

Figure 4:
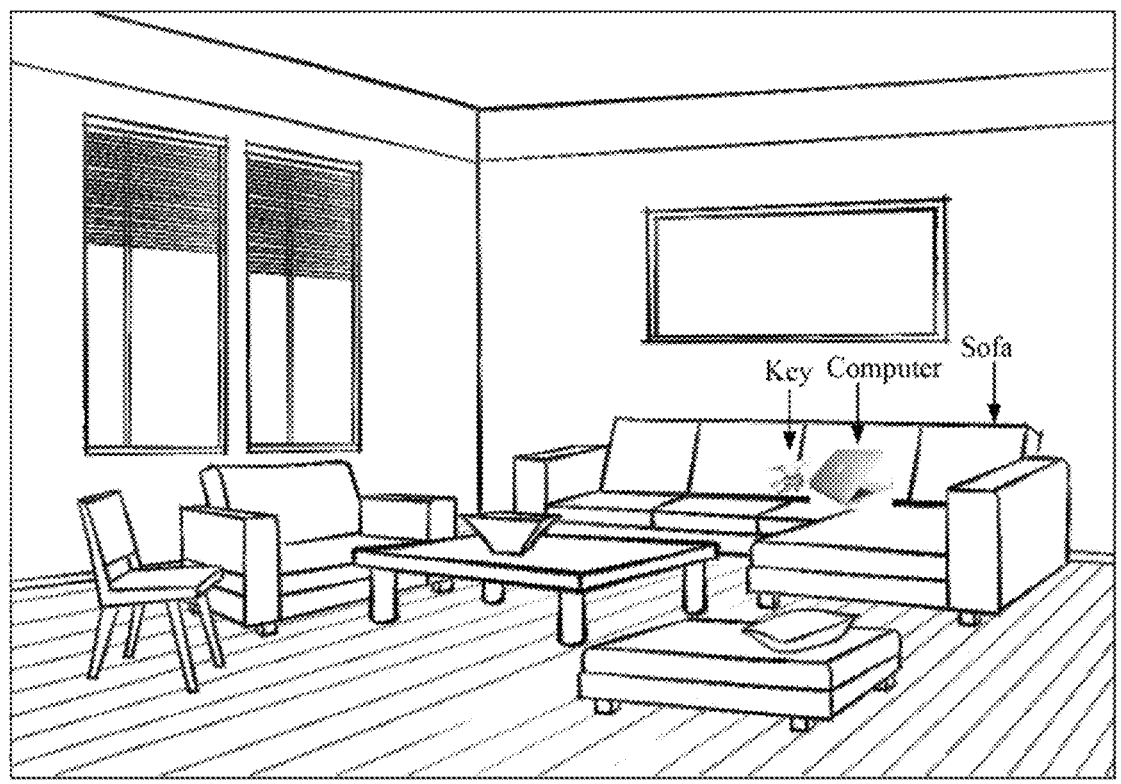
FIG. 4 is a schematic diagram of an indoor scene according to an embodiment of the disclosure.

Exemplarily, when the system is applied to the indoor scene shown in FIG. 4, when it is determined that the determined item names are "sofa" and "computer", the speech positioning information that "the key is next to the sofa and the computer" may be outputted to the user, such that effective positioning information can be provided for the user by means of providing reference objects.

Optionally, if the positioning information is in the form of speech, information fed back by the card reader may be first uploaded to the cloud server for speech semantic analysis. The server processes the information into language information that may be understood by people, and then feeds back the language information to the intelligent terminal. The intelligent terminal may play the positioning information to the user through a loudspeaker.

In the embodiments of the disclosure, since the electronic tag uses a backscatter technology, the RSSI of the electronic tag is inversely proportional to the distance, that is, the longer the distance, the weaker the RSSI. The distance is the distance between the antenna of the electronic tag and the antenna of the card reader. By means of comparing the RSSIs of an item required to be positioned and other items, other reference items, the RSSIs of which are closest to those of the item required to be positioned may be found, and the names of these reference items are fed back to the intelligent terminal.

Figure 5A:
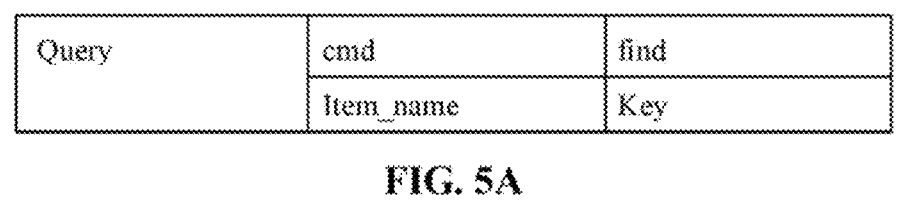

Optionally, the instruction information may be shown in FIG. 5A. Query is used to indicate that the instruction information is used to query. In FIG. 5A, a "cmd" variable is "find", which means find; and an "item name" variable is the name of an item to be found. The instruction information shown in FIG. 5A is used to find the key.

Optionally, Table 1 shows the correspondence table of the item names and the electronic tag EPCs. The table may be established when the user uses the tag at the first time, or may be established at any time before the item is positioned.

TABLE 1

| Item name | EPC |
|---|---|
| Key | AA01 |
| Remote control | AA02 |
| Cup | AA03 |
| Wallet | AA04 |
| Glasses | AA05 |
| Sofa | AA06 |
| Computer | AA07 |

Optionally, the cloud server may also store the correspondence table of the item names and the electronic tag EPCs. The generated instruction information may include the EPC corresponding to the item of key, and key information of "find".

Further, after calculating a positioning result, the microprocessor in the card reader feeds back the result to the cloud, and then feeds back the result to the intelligent terminal. The positioning result may be in the form shown in FIG. 5B. Herein, response identifies the result as a response shown in FIG. 5A; the variable "EPC" is the tag EPC; the variable "mob-item" is the item required to be positioned; "ref-item" is the reference item; and parameters "mob-item" and "ref-item" are item names corresponding to the EPCs in FIG. 5B. A variable "dist" has no actual physical significance, but is only used as the blank of an extension function. It can be seen in FIG. 5B, the method for positioning provided in the embodiments of the disclosure does not require to obtain the actual physical position of the item, but only requires to provide the name or identifier of the reference item near the item required to be positioned.

Optionally, functions of the intelligent terminal and the cloud server in FIG. 3 may all be integrated in one device. For example, in addition to the function described above, the intelligent terminal in FIG. 3 may further be integrated with a speech semantic parsing function of the cloud server.

Optionally, functions of the intelligent terminal, the cloud server and the card reader in FIG. 3 may also be integrated in one device. For example, in addition to the function described above, the card reader in FIG. 3 may further be integrated with functions of the intelligent terminal and the cloud server.

The system for positioning in the embodiments of the disclosure may include the following possible situations.

The first possible situation is that, the system for positioning includes one card reader.

The second possible situation is that, the system for positioning includes a plurality of card readers. The method for positioning provided in the embodiments of the disclosure is exemplarily described below with reference to the above possible situations.

First Embodiment

Figure 6:
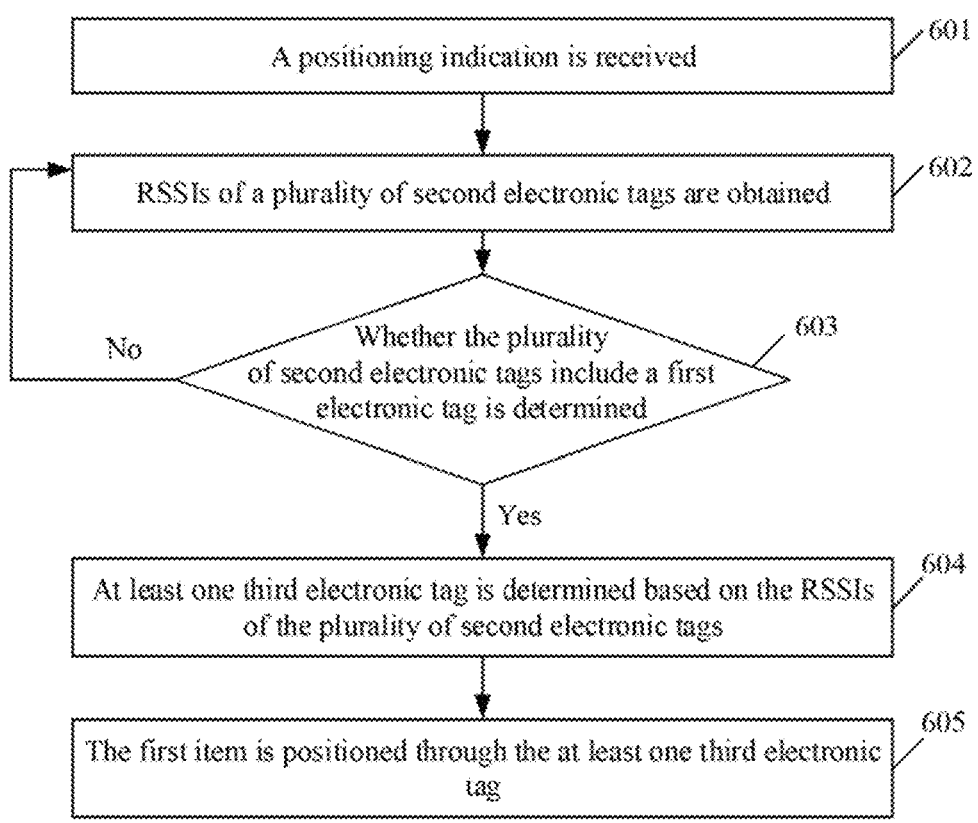
FIG. 6 is a first schematic diagram of a method for positioning according to an embodiment of the disclosure.

For the situation that the system for positioning includes one card reader,
as shown in FIG. 6, a method for positioning is provided and includes the following operations.

At operation 601, a positioning indication is received.

The positioning indication indicates positioning of a first item. The first item has a first electronic tag.

The card reader receives the positioning indication may include the following situations.

(1) The user input for the card reader is directly received, to obtain the positioning indication. Optionally, the card reader may receive speech information that the user instructs to find the first item. For example, "where is the key'?".

(2) The card reader receives the positioning indication transmitted by other devices. For example, in the system shown in FIG. 3, the intelligent terminal may receive the input of the user to generate the positioning indication, and then send the positioning indication to the card reader; or after receiving a speech instruction of the user, the intelligent terminal sends the speech instruction to the cloud server shown in FIG. 3 for speech semantic parsing, to generate the positioning indication, and sends the positioning indication to the card reader.

Optionally, the input of the user may include input in the at least one form of the following:
a speech form, a text form and an action form (which may include gestures or body movements).

When receiving the positioning indication, the card reader may start to search the electronic tags. The electronic tags within the coverage area of the antenna of the card reader send signals to the card reader, and the card reader may obtain the RSSIs of the electronic tags.

Optionally, if the card reader uses a plurality of antennas, the card reader can take turns to turn on and off different antennas based on a time sequence, to avoid interference between the antennas. In this way, the card reader may obtain the electronic tags read by each card reader and the RSSIs of the electronic tags.

At operation 602, RSSIs of a plurality of second electronic tags are obtained.

Optionally, the plurality of second electronic tags may be all of the electronic tags within the coverage area of the card reader, or may be a part of the electronic tags within the coverage area of the card reader.

In the embodiments of the disclosure, the electronic tags may be indicated through the identifiers of the electronic tags. The identifiers of the electronic tags may be EPCs.

Optionally, the obtaining of the RSSIs of the plurality of second electronic tags may be to obtain the RSSIs of a plurality of EPCs.

Exemplarily, the obtained RSSIs of 7 second electronic tags may be shown in Table 2.

TABLE 2

| EPC | RSSI |
|---|---|
| AA01 | 120 |
| AA02 | 80 |
| AA03 | 96 |
| AA04 | 95 |
| AA05 | 105 |
| AA06 | 119 |
| AA07 | 120 |

At operation 603, whether the plurality of second electronic tags include a first electronic tag is determined.

If the plurality of second electronic tags include the first electronic tag, operations 604 and 605 are executed; if the plurality of second electronic tags do not include the first electronic tag, operation 602 is executed.

At operation 604, at least one third electronic tag is determined based on the RSSIs of the plurality of second electronic tags.

Optionally, a respective RSSI of each of at least one fourth electronic tag is compared with an RSSI of the first electronic tag, and the at least one third electronic tag is determined from the at least one fourth electronic tag.

The at least one fourth electronic tag is an electronic tag other than the first electronic tag among the plurality of second electronic tags.

Assuming that the first item is a key, the EPC of the first electronic tag may be AA01 (which is obtained in combination with Table 1). Then after obtaining the RSSIs of the 7 second electronic tags shown in Table 2, the card reader may be learned that the RSSI of the first electronic tag is included in the obtained RSSIs. By means of comparing the RSSIs of AA02 to AA07 with that of AA01, it can be learned that the RSSIs of AA06 and AA07 are closer to that of AA01, and electronic tags indicated by AA06 and AA07 are the third electronic tags.

Further, the key may be determined to be near the computer and the sofa by combining AA06 and AA07 and the correspondences between the item names and the EPCs shown in Table 1.

Optionally, the card reader includes one or more receiving antennas. The operation 604 may be different based on different receiving antennas of the RSSIs of the plurality of second electronic tags during specific implementation, as described separately below.

The first situation is that, the RSSIs of the plurality of second electronic tags are received by a same receiving antenna; and the operation of comparing the RSSI of the at least one fourth electronic tag with the RSSI of the first electronic tag, and determining the at least one third electronic tag from the at least one fourth electronic tag includes the following operations.

Based on the RSSI of the at least one fourth electronic tag and the RSSI of the first electronic tag, at least one first distance parameter is obtained. The at least one first distance parameter indicates a distance between the at least one fourth electronic tag and the first electronic tag.

As the at least one third electronic tag, one or more fourth electronic tags with the first distance parameter less than or equal to a distance threshold are determined among the at least one fourth electronic tag.

Optionally, the operation of comparing the RSSI of the at least one fourth electronic tag with the RSSI of the first electronic tag, and determining the at least one third electronic tag from the at least one fourth electronic tag includes the following operations.

A first difference value between the RSSI of the at least one fourth electronic tag and the RSSI of the first electronic tag is obtained.

The at least one third electronic tag, of which the first difference value is less than or equal to a first preset difference value is determined among the at least one fourth electronic tag.

Optionally, for the situation that the card reader has one receiving antenna, the RSSIs of the plurality of second electronic tags are received by the same receiving antenna, which means that the RSSIs of the plurality of second electronic tags are received by the receiving antenna provided in the card reader.

Optionally, for the situation that the card reader has a plurality of receiving antennas, the RSSIs of the plurality of second electronic tags are received by the same receiving antenna, which means that the RSSIs of the plurality of second electronic tags are received by at least two of the plurality of receiving antennas provided in the card reader.

Optionally, some card reader may only include one receiving antenna. The type of the receiving antennas may include an omni antenna (for example, a dipole antenna or a monopole antenna) or a directional antenna (for example, a patch antenna).

Figure 7:
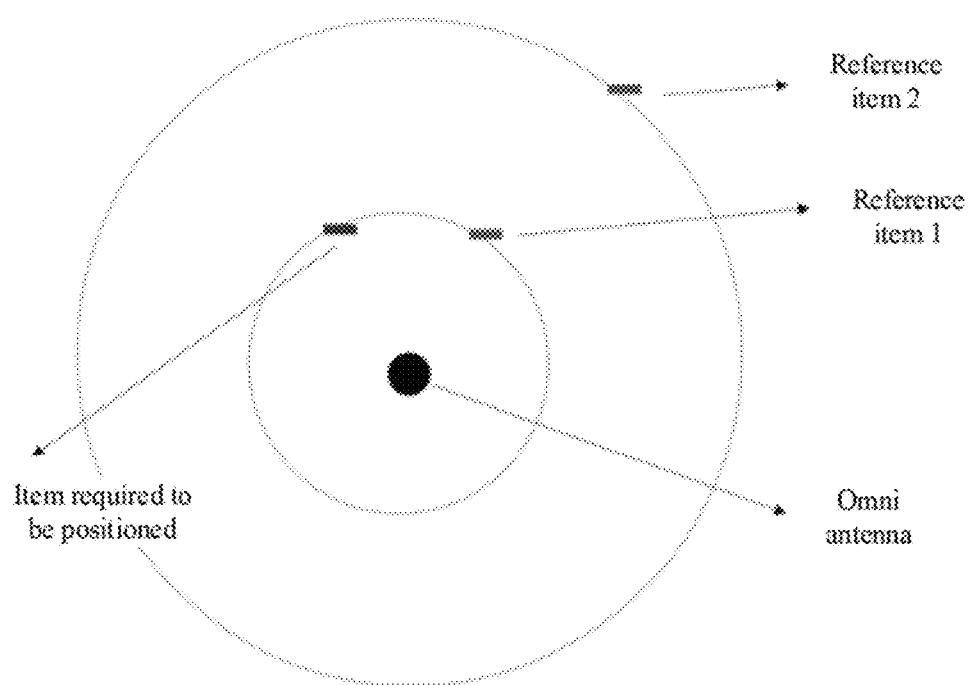
FIG. 7 is a schematic diagram of a positioning scene of a single antenna according to an embodiment of the disclosure.

Exemplarily, in FIG. 7, a card reader of a single antenna is used. The antenna is the omni receiving antenna. The distance between an item required to be positioned and the receiving antenna of the card reader is a first distance, and the distance between the reference item 1 and the antenna of the card reader is a second distance. In a case that the first distance is the same as or similar to the second distance, the RSSI value of the item required to be positioned is also the same as or similar to the RSSI value of the reference item 1 (that is, the difference value is less than a preset intensity difference value). As the reference item 2 is far from the receiving antenna of the card reader, the RSSI of the reference item 2 is weak. By comparing the RSSI of the item required to be positioned with the RSSI of other reference items, the card reader may determine that the reference item 1 is near the item required to be positioned.

Optionally, the card reader does not require to determine the actual distance between the item required to be positioned and the receiving antenna of the card reader, but only requires to determine whether a certain item is near the item required to be positioned (that is, the RSSI values of them are same or similar).

The second situation is that, the plurality of receiving antennas are included, and the RSSIs of the plurality of second electronic tags are received by a plurality of first receiving antennas; and the operation of comparing the RSSI of the at least one fourth electronic tag with the RSSI of the first electronic tag, and determining the at least one third electronic tag from the at least one fourth electronic tag includes the following operations.

When an RSSI received by at least one second receiving antenna includes the RSSI of the first electronic tag, the at least one second receiving antenna being an antenna in the plurality of first receiving antennas, the RSSI of the at least one fourth electronic tag and the RSSI of the first electronic tag that are received by each of the at least one second receiving antenna are obtained, and at least one second distance parameter is obtained; and based on the at least one second distance parameter, the at least one third electronic tag is determined.

Optionally, the operation of comparing the RSSI of the at least one fourth electronic tag with the RSSI of the first electronic tag, and determining the at least one third electronic tag from the at least one fourth electronic tag includes the following operations.

The RSSIs received by at least one second antenna include the RSSI of the first electronic tag, and the at least one second receiving antenna is an antenna in the plurality of first antennas.

A second difference value between the RSSI of the at least one fourth electronic tag and the RSSI of the first electronic tag that are received by each of the at least one second receiving antenna is obtained, to obtain G second difference values.

Based on the G second difference values, the at least one third electronic tag is determined, where G is greater than or equal to 2.

Optionally, not each receiving antenna in the antennas of the card reader may receive the RSSIs of the electronic tags. In the receiving antennas that receive the RSSIs of the electronic tags in the antennas of the card reader, the RSSI of the first electronic tag is not included in the RSSIs of the electronic tags received by each of the receiving antennas.

Exemplarily, assuming that the RSSIs received by 2 (assuming to be antenna 1 and antenna 2) of the 4 receiving antennas in the antennas of the card reader include the RSSI of the first electronic tag, second difference values between the RSSIs of the electronic tags received by the antenna 1 and the RSSI of the first electronic tag may be calculated, and second difference values between the RSSIs of the electronic tags received by the antenna 2 and the RSSI of the first electronic tag are calculated. Based on all obtained difference values, the third electronic tag (that is, the electronic tag, of which the distance from the card reader is within the preset distance range) is determined.

The operation of determining, based on the at least one second distance parameter, the at least one third electronic tag includes the following operations. When I second distance parameters for H different fourth electronic tags exist in the at least one second distance parameter, and the I second distance parameters correspond to J second receiving antennas, I being a product of H and J, for each fourth electronic tag in the H different fourth electronic tags, based on J second distance parameters corresponding to the J second receiving antennas, a third distance parameter corresponding to the fourth electronic tag is obtained, to obtain H third distance parameters; and first target distance parameters in the I second distance parameters are discarded, and based on second distance parameters other than the first target distance parameters in the I second distance parameters, the at least one third electronic tag is determined.

The first target distance parameters are second distance parameters corresponding to third distance parameters other than first n minimum third distance parameters in the H third distance parameters, where n is greater than or equal to 1 and less than H.

In a first optional implementation, the operation of determining the at least one third electronic tag based on the G second difference values includes the following operations.

When I second difference values for H different fourth electronic tags exist in the second difference values, and the I second distance parameters correspond to J second receiving antennas, where I is a product of H and J, for each fourth electronic tag in the H different fourth electronic tags, a quadratic sum of J second difference values corresponding to the J second receiving antennas is calculated to obtain H quadratic sums;

The first target difference values in the J second difference values are discarded. The first target difference values are second difference values corresponding to quadratic sums other than first n minimum quadratic sums in the H quadratic sums, where n is greater than or equal to 1 and less than H; and based on second difference values other than the first target difference values in the J second difference values, the at least one third electronic tag is determined.

The first target difference values are second difference values corresponding to quadratic sums other than first n minimum quadratic sums in the H quadratic sums, where n is greater than or equal to 1 and less than H.

Exemplarily, assuming that, as shown in Table 3, the above second difference values are 4 difference values of the RSSIs for 2 different electronic tags and the first electronic tag, and the 4 difference values are obtained by 2 receiving antennas. For the electronic tag A, the quadratic sum of 5 and 9 is found to obtain 106; and for the electronic tag B, the quadratic sum of −6 and 8 may be found to obtain 100. 106 and 100 are target values, as 100 is less than 106, the difference values 5 and 9 corresponding to 106 are discarded.

TABLE 3

| Receiving antenna | Difference value between electronic tag A and first electronic tag | Difference value between electronic tag B and first electronic tag |
|---|---|---|
| 1 | 5 | −6 |
| 2 | 9 | 8 |

In a second optional implementation, the operation of determining the at least one third electronic tag based on the G second difference values includes the following operations.

When I second difference values for H different fourth electronic tags exist in the second difference values, and the I second distance parameters correspond to J second receiving antennas, where I is a product of H and J, for each fourth electronic tag in the H different fourth electronic tags, the sum of the absolute values of J second difference values corresponding to the J second receiving antennas is calculated to obtain H target values;

The second target difference values in the J second difference values are discarded. The second target difference values are second difference values corresponding to target values other than first m minimum target values in the H target values; and based on second difference values other than the second target difference values in the J second difference values, the at least one third electronic tag is determined.

The first target difference values are second difference values corresponding to quadratic sums other than first n minimum quadratic sums in the H quadratic sums, where n is greater than or equal to 1 and less than H.

The second optional implementation is similar to the first optional implementation. No exemplary explanations are given herein. The following are exemplary descriptions for each situation of two or more receiving antennas.

(1) Double Antenna

Figure 8:
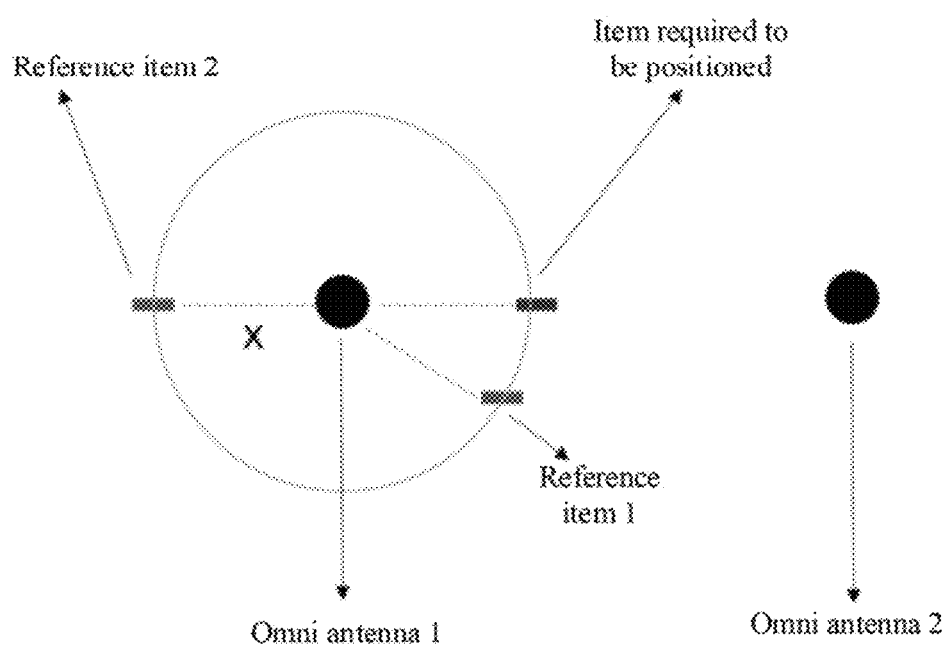
FIG. 8 is a schematic diagram of a positioning scene of a double antenna according to an embodiment of the disclosure.

A range may be positioned more accurately by means of double antenna positioning. As shown in FIG. 8, if only one omni antenna is used, since the distance between the reference item 1 and the antenna 1 of the card reader and the distance between the reference item 2 and the antenna 1 of the card reader are the same, both items are defined as "nearby". When the antenna 2 of the card reader is used, among the EPCs collected by the antenna 2 and the corresponding RSSIs, the RSSI of the reference item 1 is close to that of the item required to be positioned. The RSSI of the reference item 2 is relatively weak, such that it can be determined that the reference item 1 is near the item required to be positioned by means of the first possible implementation or the second optional implementation.

(2) Multi-Antenna

Figure 9:
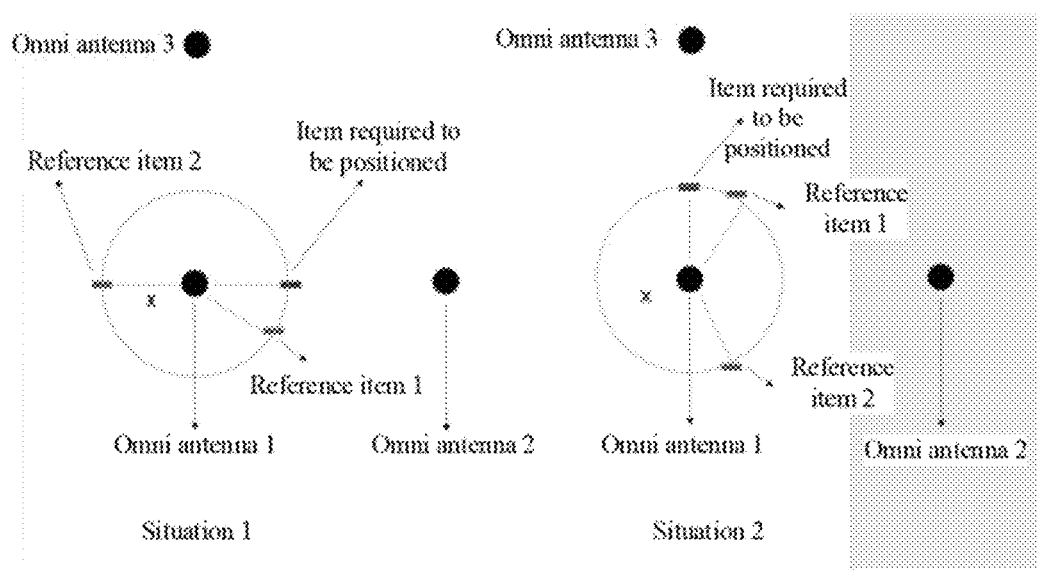
FIG. 9 is a schematic diagram of a positioning scene of three antennas according to an embodiment of the disclosure.

The accuracy of the positioning range can be further improved by means of multi-antenna positioning. The actual positions of the item required to be positioned and the reference item may be changed in a real scene, and a proposal system needs to take the change in the positions of the items into consideration. As shown in FIG. 9, by using three omni antennas, it is still possible to determine that only the reference item 1 is in the range of the item required to be positioned in situation 1 and situation 2 by means of the first possible implementation or the second optional implementation.

Although the mode using the single antenna or the double antenna may produce significant errors in some situations, the errors can be tolerated depending on the actual situations. For example, it is only required to position the item in a certain room (the room here is a reference object). Therefore, the specific antennas of the card reader and the number of antennas are not emphasized in the embodiments of the disclosure, but rather focus on highlighting the importance of the relative position.

(3) Hybrid Antenna

Figure 10:
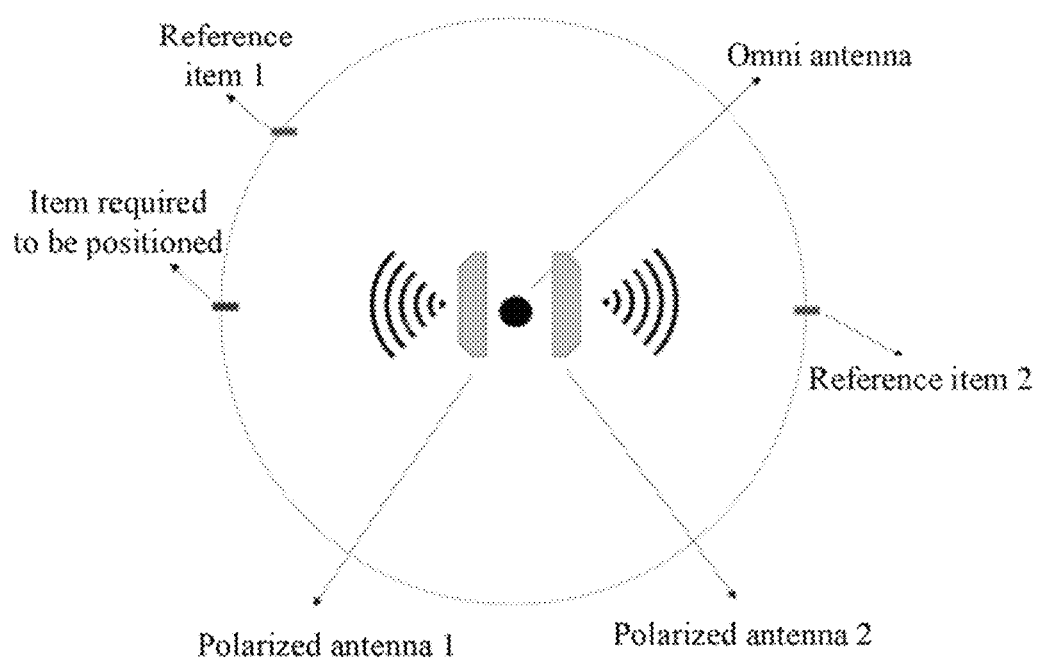
FIG. 10 is a schematic diagram of a positioning scene of a hybrid antenna according to an embodiment of the disclosure.

In the embodiments of the disclosure, the number of the antennas may be freely selected to match antenna types to deal with different scenes, so as to meet different positioning accuracy requirements. In FIG. 10, two polarized antennas and one omni antenna are used. The omni antenna has a wide coverage area, such that more electronic tags within the coverage area can be effectively read. The polarized antenna may assist in determining the orientation of the item. In the scene shown in FIG. 10, it is still possible to determine that the reference item 1 is near the item required to be positioned by means of the first possible implementation or the second optional implementation.

At operation 605, the first item is positioned through the at least one third electronic tag.

Optionally, at least one piece of second item information corresponding to the at least one third electronic tag may be determined, and the first item is positioned based on the at least one piece of second item information.

Optionally, the operation of positioning the first item based on the at least one piece of second item information includes: positioning information of the first item is determined based on the at least one piece of second item information. The positioning information indicates that the first item is located near at least one second item indicated by the at least one piece of second item information.

Optionally, the operation of positioning the first item based on the at least one piece of second item information includes: the positioning information of the first item is determined and outputted based on the at least one piece of second item information.

In the embodiments of the disclosure, when the positioning information is outputted, the speech semantic API in the intelligent terminal may be combined to achieve interaction with the user by means of speech.

For example, when speech output is used, word order logic may be identified intelligently by means of analyzing speech semantics. If the item required to be positioned is a "key", the feedback reference object is a "bedroom", a "bed", a "wallet", or a "remote control". Then a word order algorithm may determine a subject-subordinate relationship of the reference noun and perform output based on the subject-subordinate relationship.

Exemplarily, the "bedroom" may be the highest level, the "bed" is the second level, and the "wallet" and "remote control" are the third level. Therefore, the generated statement may be that "the key is near the [bedroom] and the [bed], and there are the [wallet] and the [remote control] nearby".

In the embodiments of the disclosure, a positioning indication may be received. The positioning indication indicates positioning of a first item, and the first item has a first electronic tag. RSSIs of a plurality of second electronic tags are obtained. The plurality of second electronic tags include the first electronic tag. At least one third electronic tag is determined based on the RSSIs of the plurality of second electronic tags. The first item is positioned through the at least one third electronic tag. By means of the solution, the RSSIs of the electronic tags within a coverage area of a device for positioning may be obtained through the device for positioning; and through the obtained RSSIs and the RSSI of the first item required to be positioned, at least one target electronic tag, the distance of which from the first item is within a preset distance range, is determined. In this way, the first item can be positioned based on the at least one target electronic tag and at least one second item corresponding to the at least on target electronic tag as reference, such that effective positioning information can be outputted for a user by means of providing a reference item.

The electronic tag using the backscatter technology has a lower cost, which reduces the economic burden of consumers and improves the feasibility of using the method for positioning. Indoor positioning can be effectively performed by attaching a large number of electronic tags.

Further, in the embodiments of the disclosure, relying on the characteristics of the backscatter electronic tags, the concept of the positioning of the relative position is proposed. That is to say, the exact position of the item required to be positioned is not required, only the nearby reference object is required to be provided. Therefore, the method for positioning restores the real scenes in real lite to the maximum extent, thereby improving user experience while hardware costs are reduced.

Second Embodiment

Figure 11:
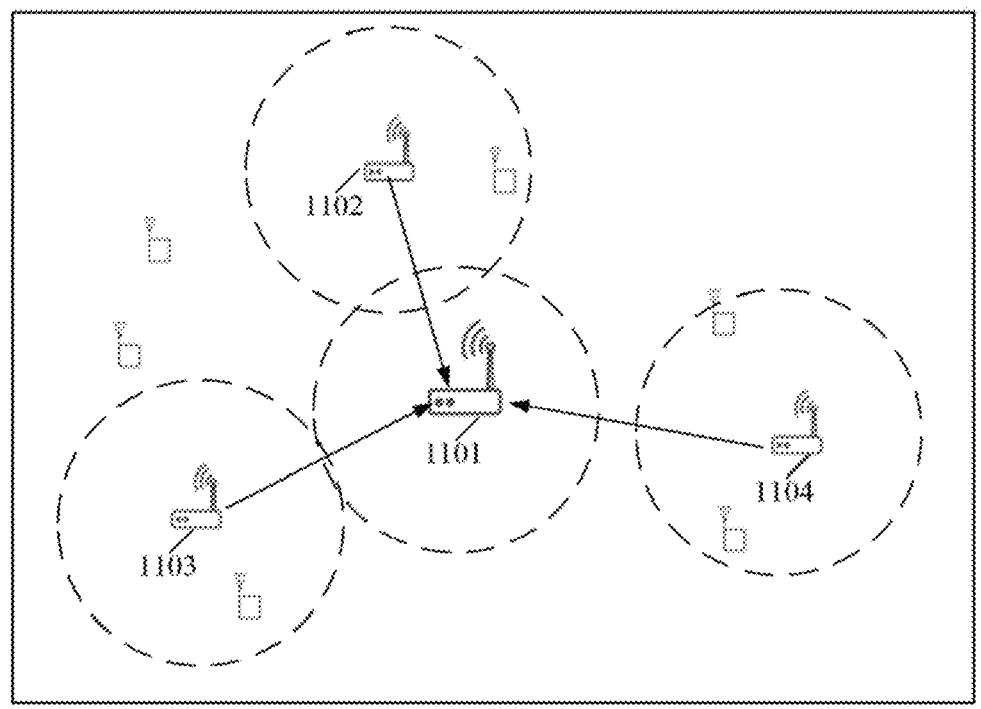
FIG. 11 is a schematic diagram of a scene of a plurality of card readers according to an embodiment of the disclosure.

For the situation that the system for positioning includes a plurality of card readers, the plurality of card readers in the system for positioning may have one master device (that is, a master card reader) and a plurality of slave devices (that is, slave card readers). The master card reader and the slave card reader have different implementations, which are respectively described below. FIG. 11 is a schematic architecture diagram of a plurality of card readers in a system for positioning. The system for positioning includes a master card reader 1101, a slave card reader 1102, a slave card reader 1103 and a slave card reader 1104. Each slave card reader may obtain the RSSIs of the electronic tags within its own coverage area, determine the third electronic tag and then report the third electronic tag to the master card reader.

Figure 12:
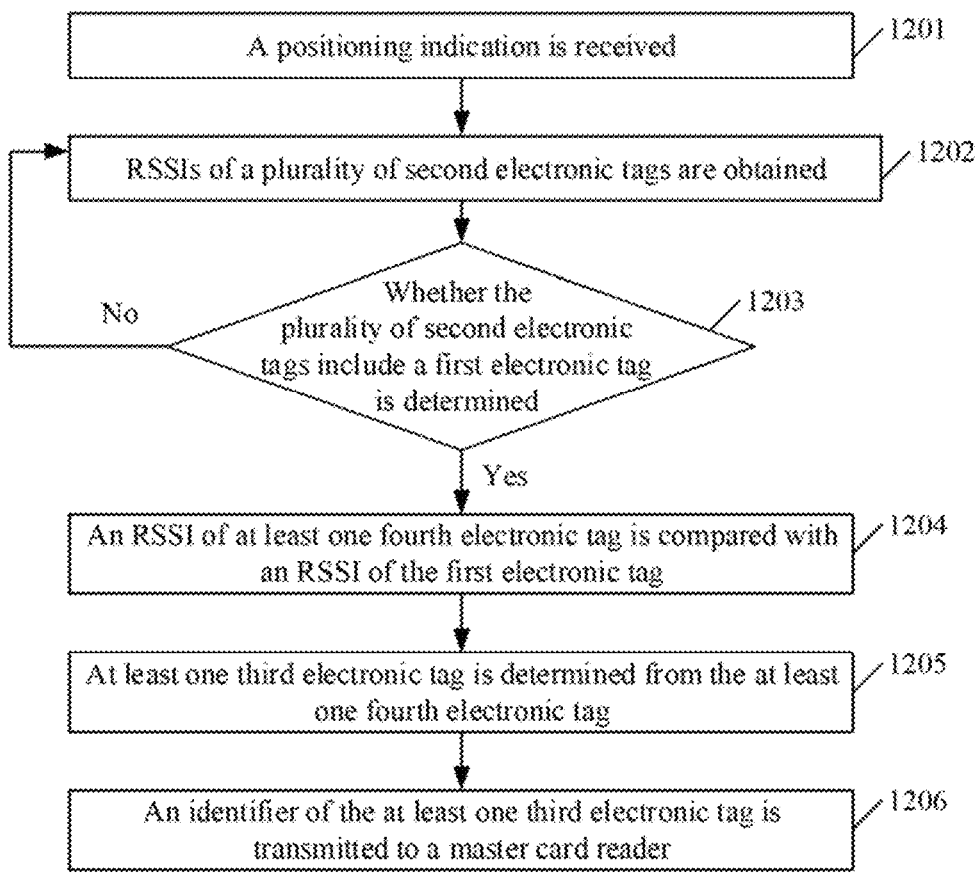
FIG. 12 is a second schematic diagram of a method for positioning according to an embodiment of the disclosure.

As shown in FIG. 12, an embodiment of the present disclosure further provides a method for positioning, which is applied to a slave card reader. Exemplarily, the method for positioning may be applied to any one of the slave card reader 1102, the slave card reader 1103 and the slave card reader 1104 in FIG. 11.

At operation 1201, a positioning indication is received.

The positioning indication indicates positioning of a first item. The first item is has a first electronic tag.

At operation 1202, RSSIs of a plurality of second electronic tags are obtained.

Where A is greater than or equal to 2.

At operation 1203, whether the plurality of second electronic tags include a first electronic tag is determined.

If the plurality of second electronic tags include the first electronic tag, operations 1204 and 1206 are executed; if the plurality of second electronic tags do not include the first electronic tag, operation 1202 is executed.

At operation 1204, an RSSI of at least one fourth electronic tag is compared with an RSSI of the first electronic tag.

The at least one fourth electronic tag is an electronic tag other than the first electronic tag among the plurality of second electronic tags.

At operation 1205, at least one third electronic tag is determined from the at least one fourth electronic tag.

The descriptions of operations 1201 to 1205 may refer to related descriptions of operations 601 to 604 in the first embodiment, which are not described herein again.

At operation 1206, an identifier of the at least one third electronic tag is transmitted to a master card reader.

Correspondingly, after receiving the identifiers of the third electronic tags transmitted by one or more slave card readers, the master card reader may determine, based on the received identifiers of the third electronic tags, the names of corresponding second items, and output the positioning information based on these names of the second items.

Exemplarily, assuming that the master card reader 1101 shown in FIG. 11 receives an identifier of the electronic tag A and an identifier of the electronic tag B transmitted by the slave card reader 1102, the identifier of the electronic tag B transmitted by the slave card reader 1103, and the identifier of the electronic tag A and an identifier of the electronic tag C transmitted by the slave card reader 1104, the master card reader 1101 may determine, based on the identifier of the electronic tag A, the identifier of the electronic tag B and the identifier of the electronic tag C, corresponding item A, item B and item C, then determine that the first item is near the item A, the item B and the item C, and output the positioning information that "the first item is near the item A, the item B and the item C".

The identifier of the at least one third electronic tag is transmitted to the master card reader from the slave card reader, to enable the master card reader to determine, based on the identifier of the at least one electronic tag, r pieces of second item information corresponding to the identifier of the at least one electronic tag, and position the first item based on the r pieces of second item information.

The second item information may be the identifier of the second item or the name of the second item.

Operation 1206 may also be replaced with the following operations.

(A) At least one piece of second item information corresponding to the at least one third electronic tag is determined.

(B) The at least one piece of second item information is transmitted to the master device, to enable the master device to position the first item based on the at least one piece of second item information.

Optionally, for the slave card reader, the slave card reader may not receive the positioning indication, that is, not execute operation 1201, but receive RSSIs of the electronic tags within the coverage area spontaneously, and then report the RSSIs to the master card reader device. The master card reader device determines the third electronic tag based on the positioning algorithm provided in the embodiments of the disclosure, so as to position the first item based on the determined third electronic tag.

In the embodiments of the disclosure, for the case that a plurality of card reader devices exist, the method for positioning suitable for each slave card reader device may be provided. By means of positioning each card reader device, effective positioning during finding of the item can be achieved in a scene with large indoor area.

Figure 13:
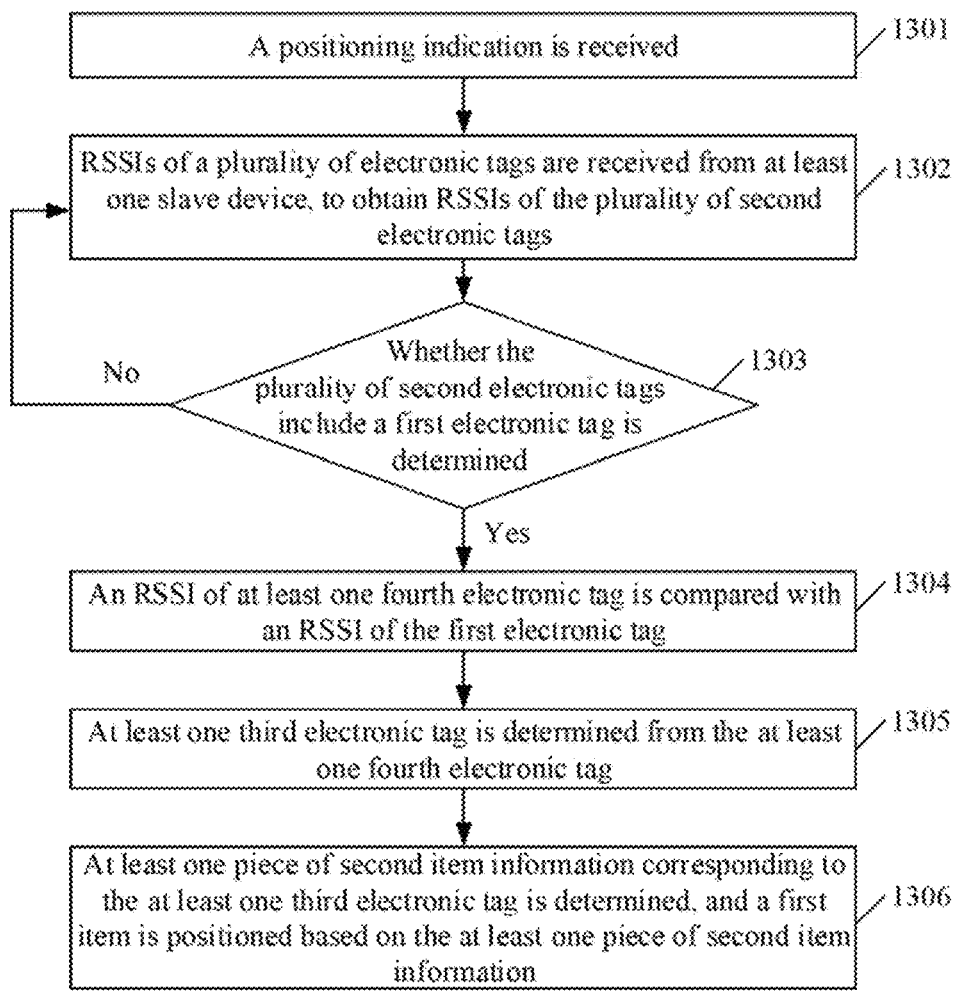
FIG. 13 is a third schematic diagram of a method for positioning according to an embodiment of the disclosure.

As shown in FIG. 13, an embodiment of the present disclosure further provides a method for positioning, which is applied to a master card reader. Exemplarily, the method for positioning may be applied to the master card reader 1101 in FIG. 11.

At operation 1301, a positioning indication is received.

The positioning indication indicates positioning of a first item. The first item has a first electronic tag.

At operation 1302, RSSIs of a plurality of electronic tags are received from at least one slave device, to obtain RSSIs of the plurality of second electronic tags.

Optionally, the RSSIs of the plurality of second electronic tags are received from at least one slave device.

Optionally, the method is applied to the master device, the RSSIs of the plurality of second electronic tags includes: an RSSI of at least one second electronic tag received from at least one slave device, and an RSSI of at least one second electronic tag obtained by the master device.

Operation 1302 may be replaced with operation 1302*a*.

At operation 1302*a*, the RSSI of at least one second electronic tag is received from the at least one slave device, and the RSSI of at least one second electronic tag is obtained by the master device, to obtain RSSIs of the plurality of second electronic tags.

At operation 1303, whether the plurality of second electronic tags include a first electronic tag is determined.

If the plurality of second electronic tags include the first electronic tag, operations 1304 and 1306 are executed; if the plurality of second electronic tags do not include the first electronic tag, operation 1302 is executed.

At operation 1304, an RSSI of at least one fourth electronic tag is compared with an RSSI of the first electronic tag.

At operation 1305, at least one third electronic tag is determined from the at least one fourth electronic tag.

At operation 1306, at least one piece of second item information corresponding to the at least one third electronic tag is determined, and a first item is positioned based on the at least one piece of second item information.

The descriptions of operations 1301, 1303 to 1306 may refer to related descriptions of operations 601, and 603 to 605 in First embodiment, which are not described herein again.

Exemplarily, all the RSSI information of the electronic tags obtained from the slave card readers may be collected to the master card reader, such that the master card reader may obtain the collected tag information shown in Table 4.

TABLE 4

| EPC | RSSI | Antenna | Card reader |
|---|---|---|---|
| XXXXX | 120 | 1 | A |
| XXXXX | 80 | 1 | A |
| XXXXX | 96 | 2 | A |
| XXXXX | 105 | 3 | A |
| XXXXX | 64 | 1 | B |

In the embodiments of the disclosure, for the case that the plurality of card readers exist, the method for positioning suitable for the master card reader may be provided. By means of receiving and collecting the RSSIs of the electronic tags obtained from each slave card reader, and performing positioning by using the collected information, effective positioning during finding of the item can be achieved in a scene with large indoor area.

Figure 14:
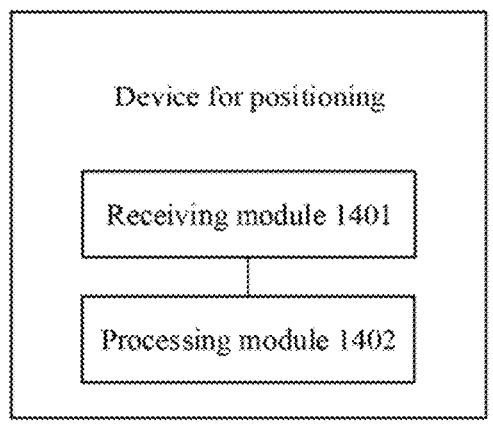
FIG. 14 is a first schematic structural diagram of a device for positioning.

As shown in FIG. 14, an embodiment of the disclosure provides a device for positioning, which includes a receiving module and a processing module.

The receiving module 1401 is configured to: receive a positioning indication, where the positioning indication indicates positioning of a first item, and the first item has a first electronic tag; and obtain RSSIs of a plurality of second electronic tags, where the plurality of second electronic tags include the first electronic tag.

The processing module 1402 is configured to: determine, based on the RSSIs of the plurality of second electronic tags, at least one third electronic tag; and position, through the at least one third electronic tag, the first item.

Optionally, the processing module 1402 is specifically configured to: compare an RSSI of at least one fourth electronic tag with an RSSI of the first electronic tag, and determine the at least one third electronic tag from the at least one fourth electronic tag, where the at least one fourth electronic tag is an electronic tag other than the first electronic tag among the plurality of second electronic tags.

Optionally, one or a plurality of receiving antennas are included.

Optionally, the RSSIs of the plurality of second electronic tags are received by a same receiving antenna; and the processing module 1402 is specifically configured to: obtain, based on the RSSI of the at least one fourth electronic tag and the RSSI of the first electronic tag, at least one first distance parameter, where the at least one first distance parameter indicates a distance between the at least one fourth electronic tag and the first electronic tag; and determine, as the at least one third electronic tag, one or more fourth electronic tags with the first distance parameter less than or equal to a distance threshold among the at least one fourth electronic tag.

Optionally, the device for positioning includes the plurality of receiving antennas, and the RSSIs of the plurality of second electronic tags are received by a plurality of first receiving antennas.

The processing module 1402 is specifically configured to: when an RSSI received by at least one second receiving antenna includes the RSSI of the first electronic tag, the at least one second receiving antenna being an antenna in the plurality of first receiving antennas, obtain the RSSI of the at least one fourth electronic tag and the RSSI of the first electronic tag that are received by each of the at least one second receiving antenna, and obtain at least one second distance parameter; and determine, based on the at least one second distance parameter, the at least one third electronic tag.

Optionally, the processing module 1402 is specifically configured to: when I second distance parameters for H different fourth electronic tags exist in the at least one second distance parameter, and the I second distance parameters correspond to J second receiving antennas, I being a product of H and J, for each fourth electronic tag in the H different fourth electronic tags, obtain, based on J second distance parameters corresponding to the J second receiving antennas, a third distance parameter corresponding to the fourth electronic tag, to obtain H third distance parameters; and discard first target distance parameters in the I second distance parameters, and determine, based on second distance parameters other than the first target distance parameters in the I second distance parameters, the at least one third electronic tag, where the first target distance parameters are second distance parameters corresponding to third distance parameters other than first n minimum third distance parameters in the H third distance parameters, where n is greater than or equal to 1 and less than H.

Optionally, the processing module 1402 is specifically configured to: determine at least one piece of second item information corresponding to the at least one third electronic tag, and position, based on the at least one piece of second item information, the first item.

Optionally, the processing module 1402 is specifically configured to: determine, based on the at least one piece of second item information, positioning information of the first item, where the positioning information indicates that the first item is located near at least one second item indicated by the at least one piece of second item information.

Figure 15:
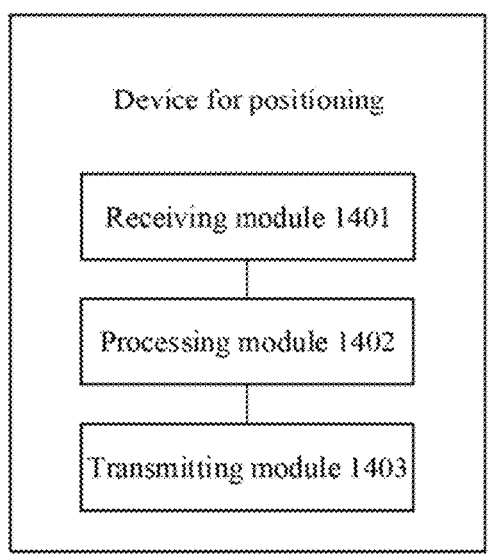
FIG. 15 is a second schematic structural diagram of a device for positioning.

Optionally, in combination with FIG. 14, as shown in FIG. 15, the device for positioning is applied to a slave device and further includes:

a transmitting module 1403, configured to transmit, to a master device, at least one piece of second item information corresponding to the at least one third electronic tag, to enable the master device to position the first item based on the at least one piece of second item information.

Optionally, the device for positioning is applied to a slave device and further includes:

a transmitting module 1403, configured to transmit, to a master device, an identifier of the at least one third electronic tag, to enable the master device to determine, based on the identifier of the at least one third electronic tag, at least one piece of second item information corresponding to the identifier of the at least one third electronic tag, and position the first item based on the at least one piece of second item information.

Optionally, the second item information includes at least one of: a name of a second item, or an identifier of the second item.

Optionally, the identifier of the third electronic tag includes an EPC.

Optionally, the device for positioning is applied to a master device. The RSSIs of the plurality of second electronic tags are received from a plurality of slave devices.

Optionally, the device for positioning is applied to a master device.

The RSSIs of the plurality of second electronic tags include: an RSSI of at least one second electronic tag received from at least one slave device, and an RSSI of at least one second electronic tag obtained by the master device.

Optionally, the electronic tag includes a backscatter module.

Figure 16:
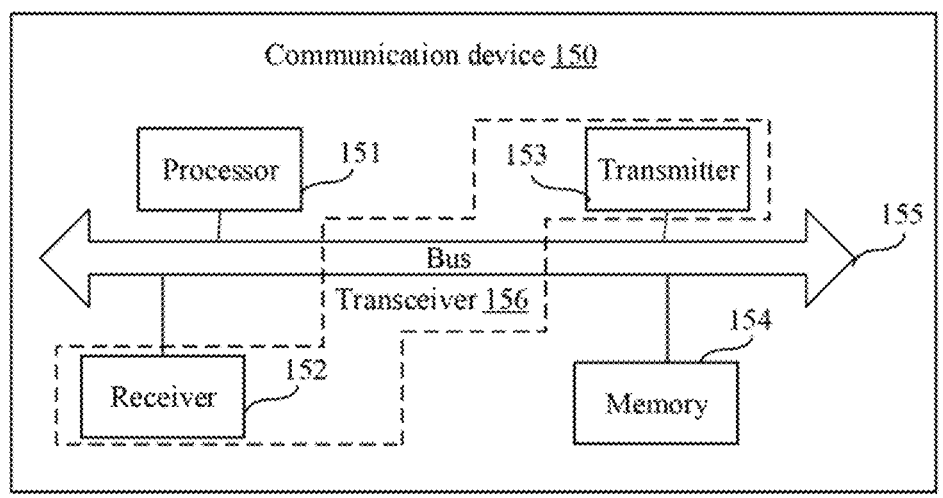
FIG. 16 is a schematic structural diagram of a communication device.

Reference is made to FIG. 16, which illustrates a schematic structural diagram of a communication device 150 according to an embodiment of the disclosure. The communication device 150 can be, for example, a terminal device, a device for positioning, a server, a network device, or the like. The communication device 150 may include: a processor 151, a receiver 152, a transmitter 153, a memory 154, and a bus 155.

The processor 151 includes one or more processing cores. The processor 151 executes various functional applications and information processing by executing a software program and modules.

The receiver 152 and the transmitter 153 may be implemented as a transceiver 156. The transceiver 156 may be a communication chip.

The memory 154 is connected to the processor 151 through the bus 155.

The memory 154 may be configured to store a computer program. The processor 151 is configured to execute the computer program to implement various operations executed by the device for positioning in the abovementioned method embodiments.

An embodiment of the disclosure further provides a device for positioning, which includes: a memory storing executable program codes, and a processor coupled to the memory.

The processor calls the executable program codes stored in the memory, to perform the method for positioning executed by the card reader in the embodiments of the disclosure.

In the embodiments in the disclosure, the device for positioning may be the card reader shown in FIG. 2. An RF front end of the card reader is configured to: receive a positioning indication, where the positioning indication indicates positioning of a first item, and the first item has a first electronic tag; and obtain RSSIs of a plurality of second electronic tags, where the plurality of second electronic tags include the first electronic tag.

The microprocessor of the card reader is configured to: determine, based on the RSSIs of the plurality of second electronic tags, at least one third electronic tag; and
position, through the at least one third electronic tag, the first item.

Optionally, the microprocessor is specifically configured to: compare an RSSI of at least one fourth electronic tag with an RSSI of the first electronic tag, and determine the at least one third electronic tag from the at least one fourth electronic tag,
where the at least one fourth electronic tag is an electronic tag other than the first electronic tag among the plurality of second electronic tags.

Optionally, the card reader includes one or a plurality of receiving antennas.

Optionally, the RSSIs of the plurality of second electronic tags are received by a same receiving antenna. The microprocessor is specifically configured to:
obtain, based on the RSSI of the at least one fourth electronic tag and the RSSI of the first electronic tag, at least one first distance parameter, where the at least one first distance parameter indicates a distance between the at least one fourth electronic tag and the first electronic tag; and
determine, as the at least one third electronic tag, one or more fourth electronic tags with the first distance parameter less than or equal to a distance threshold among the at least one fourth electronic tag.

Optionally, the device for positioning includes the plurality of receiving antennas, and the RSSIs of the plurality of second electronic tags are received by a plurality of first receiving antennas.

The microprocessor is specifically configured to: when an RSSI received by at least one second receiving antenna includes the RSSI of the first electronic tag, the at least one second receiving antenna being an antenna in the plurality of first receiving antennas,
obtain the RSSI of the at least one fourth electronic tag and the RSSI of the first electronic tag that are received by each of the at least one second receiving antenna, and obtain at least one second distance parameter; and
determine, based on the at least one second distance parameter, the at least one third electronic tag.

Optionally, the microprocessor is specifically configured to: when I second distance parameters for H different fourth electronic tags exist in the at least one second distance parameter, and the I second distance parameters correspond to J second receiving antennas, I being a product of H and J,
for each fourth electronic tag in the H different fourth electronic tags, obtain, based on J second distance parameters corresponding to the J second receiving antennas, a third distance parameter corresponding to the fourth electronic tag, to obtain H third distance parameters; and
discard first target distance parameters in the I second distance parameters, and determine, based on second distance parameters other than the first target distance parameters in the I second distance parameters, the at least one third electronic tag,
where the first target distance parameters are second distance parameters corresponding to third distance parameters other than first n minimum third distance parameters in the H third distance parameters, where n is greater than or equal to 1 and less than H.

Optionally, the microprocessor is specifically configured to: determine at least one piece of second item information corresponding to the at least one third electronic tag, and position, based on the at least one piece of second item information, the first item.

Optionally, the microprocessor is specifically configured to: determine, based on the at least one piece of second item information, positioning information of the first item, where the positioning information indicates that the first item is located near at least one second item indicated by the at least one piece of second item information.

Optionally, the device for positioning is applied to a slave device, that is, a slave card reader, and further includes:
an RF front end, configured to transmit, to a master device, at least one piece of second item information corresponding to the at least one third electronic tag, to enable the master device to position the first item based on the at least one piece of second item information.

Optionally, the device for positioning is applied to a slave device, that is, a slave card reader, and further includes:
an RF front end, configured to transmit, to a master device, an identifier of the at least one third electronic tag, to enable the master device to determine, based on the identifier of the at least one third electronic tag, at least one piece of second item information corresponding to the identifier of the at least one third electronic tag, and position the first item based on the at least one piece of second item information.

Optionally, the second item information includes at least one of: a name of a second item, or an identifier of the second item.

Optionally, the identifier of the third electronic tag includes an EPC.

Optionally, the device for positioning is applied to a master device. The RSSIs of the plurality of second electronic tags are received from a plurality of slave devices.

Optionally, the device for positioning is applied to a master device.

The RSSIs of the plurality of second electronic tags include: an RSSI of at least one second electronic tag received from at least one slave device, and an RSSI of at least one second electronic tag obtained by the master device.

Optionally, the electronic tag includes a backscatter module.

An embodiment of the disclosure provides a terminal device, which includes the device for positioning (for example, the card reader) in the embodiments of the disclosure.

An embodiment of the disclosure provides a system for positioning, which includes a plurality of electronic tags and the device for positioning (for example, the card reader) in the embodiments of the disclosure.

An embodiment of the disclosure provides a system for positioning, which includes a plurality of electronic tags and the device for positioning in the embodiments of the disclosure, an intelligent terminal and a cloud server.

An embodiment of the present disclosure further provides a computer-readable storage medium including computer instructions, which, when being executed on a computer, cause the computer to perform processes that are executed by the card reader in the above method embodiments.

An embodiment of the present disclosure further provides a computer program product, including: computer instructions, which, when being executed on a computer, cause the computer to perform processes that are executed by the card reader in the above method embodiments.

An embodiment of the present disclosure further provides a computer program product, including: computer instructions, which, when being executed on a computer, cause the computer to perform processes that are executed by the device for positioning in the above method embodiments.

An embodiment of the present disclosure further provides a chip. The chip is coupled to a memory in a terminal device and calls, during operation, program instructions stored in the memory, to cause the terminal device to perform processes that are executed by the device for positioning in the above method embodiments.

An embodiment of the present disclosure further provides a chip. The chip is coupled to a memory in a network device and calls, during operation, program instructions stored in the memory, to cause the network device to perform processes that are executed by the device for positioning in the above method embodiments.

Embodiments of the disclosure provide a method and device for positioning, and a non-transitory computer-readable storage medium. A first item may be positioned by means of a target electronic tag that is within a preset distance range from the first item, such that the position of an item can be positioned in an indoor scene by means of the solution.

In the above embodiments, it may be implemented in whole or in part by software, hardware, firmware, or any combination thereof. When the software is used for implementation, it may be implemented in whole or in part in the form of the computer program product. The computer program product includes one or more computer instructions. When the above computer program instruction is loaded and executed on a computer, the above processes or functions according to the embodiments of the disclosure are generated in whole or in part. The above computer may be a general computer, a special computer, a computer network, or other programmable apparatus. The above computer instruction may be stored in the computer-readable storage medium or transmitted from one computer-readable storage medium to another computer-readable storage medium. For example, the above computer instruction may be transmitted from a website site, a computer, a server, or a data center to another website site, another computer, another server, or another data center via wire (for example, a coaxial cable, an optical fiber, a Digital Subscriber Line (DSL)) or wireless (for example, infrared, wireless, microwave, or the like). The computer-readable storage medium may be any available medium that can be accessed by a computer, or a data storage device, such as a server and a data center, that includes one or more available mediums integrated. The above available medium may be a magnetic medium (for example, a floppy disk, a hard disk, and a magnetic tape), an optical medium (for example, DVD), or a semiconductor medium (for example, Solid State Disk (SSD)), and the like.

Terms "first", "second", "third", "fourth" and the like (if exists) in the description, claims and the above-mentioned drawings of this application are used for distinguishing similar objects rather than describing a specific sequence or a precedence order. It should be understood that the data used in such a way may be exchanged where appropriate, in order that the embodiments described here can be implemented in an order other than those illustrated or described herein. In addition, terms "include" and "have" and any variations thereof are intended to cover non-exclusive inclusions. For example, it is not limited for processes, methods, systems, products or devices containing a series of steps or units to clearly list those steps or units, and other steps or units which are not clearly listed or are inherent to these processes, methods, products or devices may be included instead.

The invention claimed is:

1. A method for positioning, comprising:
receiving a positioning indication, wherein the positioning indication indicates positioning of a first item, and the first item has a first electronic tag;
obtaining Received Signal Strength Indicators (RSSIs) of a plurality of second electronic tags, wherein the plurality of second electronic tags comprise the first electronic tag;
comparing an RSSI of at least one fourth electronic tag with an RSSI of the first electronic tag, and determining at least one third electronic tag from the at least one fourth electronic tag, wherein the at least one fourth electronic tag is an electronic tag other than the first electronic tag among the plurality of second electronic tags; and
positioning, through the at least one third electronic tag, the first item, wherein the method is applied to a device for positioning that comprises one or a plurality of receiving antennas;
wherein the RSSIs of the plurality of second electronic tags are received by a same receiving antenna; and
comparing the RSSI of the at least one fourth electronic tag with the RSSI of the first electronic tag, and determining the at least one third electronic tag from the at least one fourth electronic tag comprises:
  obtaining, based on the RSSI of the at least one fourth electronic tag and the RSSI of the first electronic tag, at least one first distance parameter, wherein the at least one first distance parameter indicates a distance between the at least one fourth electronic tag and the first electronic tag; and
  determining as the at least one third electronic tag, one or more fourth electronic tags with the first distance parameter less than or equal to a distance threshold among the at least one fourth electronic tag.

2. The method of claim 1, wherein the plurality of receiving antennas are comprised, and the RSSIs of the plurality of second electronic tags are further received by a plurality of first receiving antennas; and comparing the RSSI of the at least one fourth electronic tag with the RSSI of the first electronic tag, and determining the at least one third electronic tag from the at least one fourth electronic tag further comprises:
  when an RSSI received by at least one second receiving antenna comprises the RSSI of the first electronic tag, the at least one second receiving antenna being an antenna in the plurality of first receiving antennas,
  obtaining the RSSI of the at least one fourth electronic tag and the RSSI of the first electronic tag that are received by each of the at least one second receiving antenna, and obtaining at least one second distance parameter; and
  determining, based on the at least one second distance parameter, the at least one third electronic tag.

3. The method of claim 2, wherein determining, based on the at least one second distance parameter, the at least one third electronic tag comprises:
  when I second distance parameters for H different fourth electronic tags exist in the at least one second distance parameter, and the I second distance parameters correspond to J second receiving antennas, I being a product of H and J,
  for each fourth electronic tag in the H different fourth electronic tags, obtaining, based on J second distance parameters corresponding to the J second receiving antennas, a third distance parameter corresponding to the fourth electronic tag, to obtain H third distance parameters; and
  discarding first target distance parameters in the I second distance parameters, and determining, based on second distance parameters other than the first target distance parameters in the I second distance parameters, the at least one third electronic tag,
  wherein the first target distance parameters are second distance parameters corresponding to third distance parameters other than first n minimum third distance parameters in the H third distance parameters, where n is greater than or equal to 1 and less than H.

4. The method of claim 1, wherein positioning, through the at least one third electronic tag, the first item comprises:
  determining at least one piece of second item information corresponding to the at least one third electronic tag, and positioning, based on the at least one piece of second item information, the first item, wherein positioning, based on the at least one piece of second item information, the first item comprises:
  determining, based on the at least one piece of second item information, positioning information of the first item, wherein the positioning information indicates that the first item is located near at least one second item indicated by the at least one piece of second item information.

5. The method of claim 1, wherein the method is applied to a slave device, and the method further comprises:
  transmitting, to a master device, at least one piece of second item information corresponding to the at least one third electronic tag, to enable the master device to position the first item based on the at least one piece of second item information; or
  transmitting, to a master device, an identifier of the at least one third electronic tag, to enable the master device to determine, based on the identifier of the at least one third electronic tag, at least one piece of second item information corresponding to the identifier of the at least one third electronic tag, and position the first item based on the at least one piece of second item information,
  wherein the second item information comprises at least one of: a name of a second item, or an identifier of the second item,
  wherein the identifier of the third electronic tag comprises an Electronic Product Code (EPC).

6. The method of claim 1, wherein the method is applied to a master device, wherein:
  the RSSIs of the plurality of second electronic tags are received from a plurality of slave devices; or
  the RSSIs of the plurality of second electronic tags comprise:
    an RSSI of at least one second electronic tag received from at least one slave device, and an RSSI of at least one second electronic tag obtained by the master device.

7. The method of claim 1, wherein the electronic tag comprises a backscatter module.

8. A device for positioning, comprising:
  a receiver, configured to: receive a positioning indication, wherein the positioning indication indicates positioning of a first item, and the first item has a first electronic tag; and obtain Received Signal Strength Indicators (RSSIs) of a plurality of second electronic tags, wherein the plurality of second electronic tags comprise the first electronic tag; and
  a processor, configured to: compare an RSSI of at least one fourth electronic tag with an RSSI of the first electronic tag, and determine at least one third electronic tag from the at least one fourth electronic tag, wherein the at least one fourth electronic tag is an electronic tag other than the first electronic tag among the plurality of second electronic tags; and position, through the at least one third electronic tag, the first item,
  wherein one or a plurality of receiving antennas are comprised;
  wherein the RSSIs of the plurality of second electronic tags are received by a same receiving antenna; and
  the processor is configured to:
    obtain, based on the RSSI of the at least one fourth electronic tag and the RSSI of the first electronic tag, at least one first distance parameter, wherein the at least one first distance parameter indicates a distance between the at least one fourth electronic tag and the first electronic tag; and determine, as the at least one third electronic tag, one or more fourth electronic tags with the first distance parameter less than or equal to a distance threshold among the at least one fourth electronic tag.

9. The device for positioning of claim 8, wherein the device for positioning comprises the plurality of receiving antennas, and the RSSIs of the plurality of second electronic tags are further received by a plurality of first receiving antennas; and the processor is further configured to: when an RSSI received by at least one second receiving antenna comprises the RSSI of the first electronic tag, the at least one second receiving antenna being an antenna in the plurality of first receiving antennas, obtain the RSSI of the at least one fourth electronic tag and the RSSI of the first electronic tag that are received by each of the at least one second receiving antenna, and obtain at least one second distance parameter; and determine, based on the at least one second distance parameter, the at least one third electronic tag.

10. The device for positioning of claim 9, wherein the processor is configured to: when I second distance parameters for H different fourth electronic tags exist in the at least one second distance parameter, and the I second distance parameters correspond to J second receiving antennas, I being a product of H and J, for each fourth electronic tag in the H different fourth electronic tags, obtain, based on J second distance parameters corresponding to the J second receiving antennas, a third distance parameter corresponding to the fourth electronic tag, to obtain H third distance parameters; and discard first target distance parameters in the I second distance parameters, and determine, based on second distance parameters other than the first target distance parameters in the I second distance parameters, the at least one third electronic tag, wherein the first target distance parameters are second distance parameters corresponding to third distance parameters other than first n minimum third distance parameters in the H third distance parameters, where n is greater than or equal to 1 and less than H.

11. The device for positioning of claim 8, wherein the processor is configured to: determine at least one piece of second item information corresponding to the at least one third electronic tag, and position, based on the at least one piece of second item information, the first item, wherein the processor is configured to: determine, based on the at least one piece of second item information, positioning information of the first item, wherein the positioning information indicates that the first item is located near at least one second item indicated by the at least one piece of second item information.

12. The device for positioning of claim 8, wherein the device for positioning is applied to a slave device, and the device for positioning further comprises:

a transmitter, configured to:

transmit, to a master device, at least one piece of second item information corresponding to the at least one third electronic tag, to enable the master device to position the first item based on the at least one piece of second item information; or transmit, to a master device, an identifier of the at least one third electronic tag, to enable the master device to determine, based on the identifier of the at least one third electronic tag, at least one piece of second item information corresponding to the identifier of the at least one third electronic tag, and position the first item based on the at least one piece of second item information, wherein the second item information comprises at least one of: a name of a second item, or an identifier of the second item, wherein the identifier of the third electronic tag comprises an Electronic Product Code (EPC).

13. The device for positioning of claim 8, wherein the device for positioning is applied to a master device, wherein:

the RSSIs of the plurality of second electronic tags are received from a plurality of slave devices; or the RSSIs of the plurality of second electronic tags comprise:

an RSSI of at least one second electronic tag received from at least one slave device, and an RSSI of at least one second electronic tag obtained by the master device, wherein the electronic tag comprises a backscatter.

14. A non-transitory computer-readable storage medium having stored thereon computer-executable instructions that, when executed by a processor, cause the processor to perform operations of:

receiving a positioning indication, wherein the positioning indication indicates positioning of a first item, and the first item has a first electronic tag;

obtaining Received Signal Strength Indicators (RSSIs) of a plurality of second electronic tags, wherein the plurality of second electronic tags comprise the first electronic tag;

comparing an RSSI of at least one fourth electronic tag with an RSSI of the first electronic tag, and determining at least one third electronic tag from the at least one fourth electronic tag, wherein the at least one fourth electronic tag is an electronic tag other than the first electronic tag among the plurality of second electronic tags; and positioning, through the at least one third electronic tag, the first item, wherein the non-transitory computer-readable storage medium is applied to a device for positioning that comprises one or a plurality of receiving antennas;

wherein the RSSIs of the plurality of second electronic tags are received by a same receiving antenna; and comparing the RSSI of the at least one fourth electronic tag with the RSSI of the first electronic tag, and determining the at least one third electronic tag from the at least one fourth electronic tag comprises:

obtaining based on the RSSI of the at least one fourth electronic tag and the RSSI of the first electronic tag, at least one first distance parameter, wherein the at least one first distance parameter indicates a distance between the at least one fourth electronic tag and the first electronic tag; and determining, as the at least one third electronic tag, one or more fourth electronic tags with the first distance parameter less than or equal to a distance threshold among the at least one fourth electronic tag.

15. The non-transitory computer-readable storage medium of claim 14, wherein the plurality of receiving antennas are comprised, and the RSSIs of the plurality of second electronic tags are further received by a plurality of first receiving antennas; and comparing the RSSI of the at least one fourth electronic tag with the RSSI of the first electronic tag, and determining the at least one third electronic tag from the at least one fourth electronic tag further comprises:

when an RSSI received by at least one second receiving antenna comprises the RSSI of the first electronic tag, the at least one second receiving antenna being an antenna in the plurality of first receiving antennas, obtaining the RSSI of the at least one fourth electronic tag and the RSSI of the first electronic tag that are received by each of the at least one second receiving antenna, and obtaining at least one second distance parameter; and determining, based on the at least one second distance parameter, the at least one third electronic tag.

16. The non-transitory computer-readable storage medium of claim 15, wherein determining, based on the at least one second distance parameter, the at least one third electronic tag comprises:

when I second distance parameters for H different fourth electronic tags exist in the at least one second distance parameter, and the I second distance parameters correspond to J second receiving antennas, I being a product of H and J, for each fourth electronic tag in the H different fourth electronic tags, obtaining, based on J second distance parameters corresponding to the J second receiving antennas, a third distance parameter corresponding to the fourth electronic tag, to obtain H third distance parameters; and discarding first target distance parameters in the I second distance parameters, and determining, based on second distance parameters other than the first target distance parameters in the I second distance parameters, the at least one third electronic tag, wherein the first target distance parameters are second distance parameters corresponding to third distance parameters other than first n minimum third distance parameters in the H third distance parameters, where n is greater than or equal to 1 and less than H.

17. The non-transitory computer-readable storage medium of claim 14, wherein positioning, through the at least one third electronic tag, the first item comprises:

determining at least one piece of second item information corresponding to the at least one third electronic tag, and positioning, based on the at least one piece of second item information, the first item, wherein positioning, based on the at least one piece of second item information, the first item comprises:

determining, based on the at least one piece of second item information, positioning information of the first item, wherein the positioning information indicates that the first item is located near at least one second item indicated by the at least one piece of second item information.

18. The non-transitory computer-readable storage medium of claim 14, wherein the non-transitory computer-readable storage medium is applied to a slave device, and the operations further comprise:

transmitting, to a master device, at least one piece of second item information corresponding to the at least one third electronic tag, to enable the master device to position the first item based on the at least one piece of second item information; or transmitting, to a master device, an identifier of the at least one third electronic tag, to enable the master device to determine, based on the identifier of the at least one third electronic tag, at least one piece of second item information corresponding to the identifier of the at least one third electronic tag, and position the first item based on the at least one piece of second item information, wherein the second item information comprises at least one of: a name of a second item, or an identifier of the second item, wherein the identifier of the third electronic tag comprises an Electronic Product Code (EPC).

19. The non-transitory computer-readable storage medium of claim 14, wherein the non-transitory computer-readable storage medium is applied to a master device, wherein:

the RSSIs of the plurality of second electronic tags are received from a plurality of slave devices; or the RSSIs of the plurality of second electronic tags comprise:

an RSSI of at least one second electronic tag received from at least one slave device, and an RSSI of at least one second electronic tag obtained by the master device.

20. The non-transitory computer-readable storage medium of claim 14, wherein the electronic tag comprises a backscatter module.

* * * * *